United States Patent [19]

Walther et al.

[11] 3,884,332

[45] May 20, 1975

[54] DISC BRAKE WITH CANTILEVERED TORQUE RECEIVING MEMBERS

[75] Inventors: William D. Walther, Kettering; Chester N. Fannin, Troy, both of Ohio

[73] Assignee: Dayton-Walther Corporation, Dayton, Ohio

[22] Filed: Mar. 14, 1974

[21] Appl. No.: 451,035

[52] U.S. Cl. ............... 188/73.4; 188/73.5; 188/73.6
[51] Int. Cl. ............................................. F16d 65/02
[58] Field of Search ....... 188/73.3, 72.4, 73.5, 73.6, 188/73.4

[56] References Cited
UNITED STATES PATENTS

| | | | |
|---|---|---|---|
| 3,156,325 | 11/1964 | Taylor | 188/72.5 |
| 3,402,789 | 9/1968 | Biabaud | 188/73.6 |
| 3,442,354 | 5/1969 | Belart | 188/73.3 X |
| 3,602,328 | 8/1971 | Fannin et al. | 188/73.6 X |
| 3,605,956 | 9/1971 | Hahm et al. | 188/73.6 X |
| 3,625,314 | 12/1971 | Rinker | 188/73.5 X |
| 3,782,509 | 1/1974 | Cook | 188/73.3 |

*Primary Examiner*—George E. A. Halvosa
*Attorney, Agent, or Firm*—Biebel, French & Bugg

[57] ABSTRACT

A disc brake of floating caliper, split pad construction in which cantilevered pins serve as torque receiving members for the brake pads. With this construction clearances between the top of the brake housing and the rim of the wheel with which the brake is associated are not as critical and the torque receiving members are positioned such that there is a more direct transfer of torque from the brake pads to the torque receiving members, thereby decreasing stresses imposed on backing plates for the brake pads during braking action. The brake housing may be formed of two separate portions bolted together or as a one piece housing in which the piston and reaction portions and bridge members are formed integrally.

5 Claims, 8 Drawing Figures

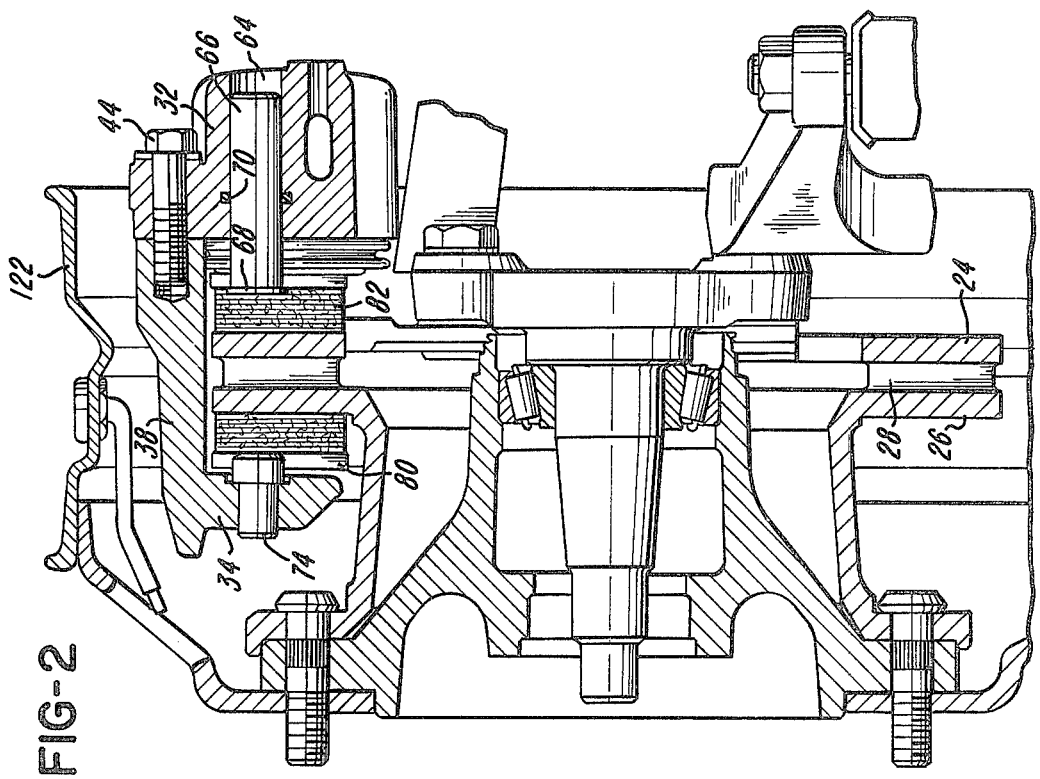
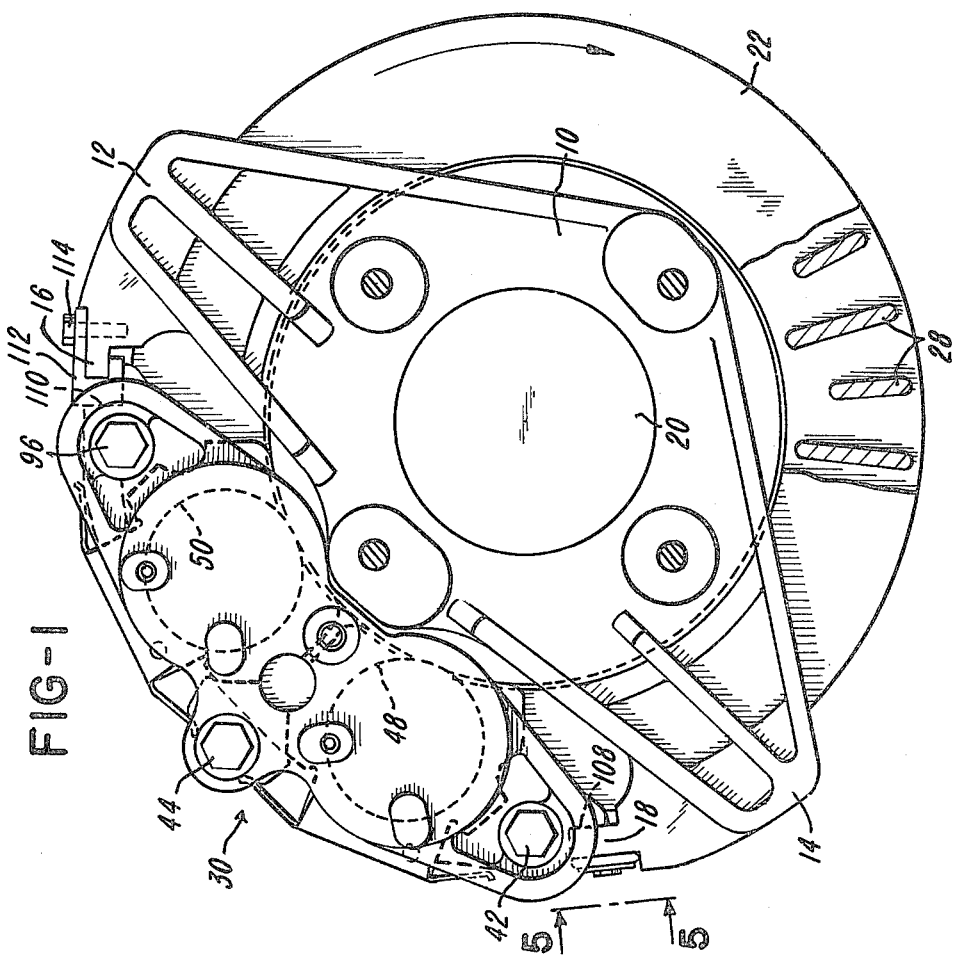

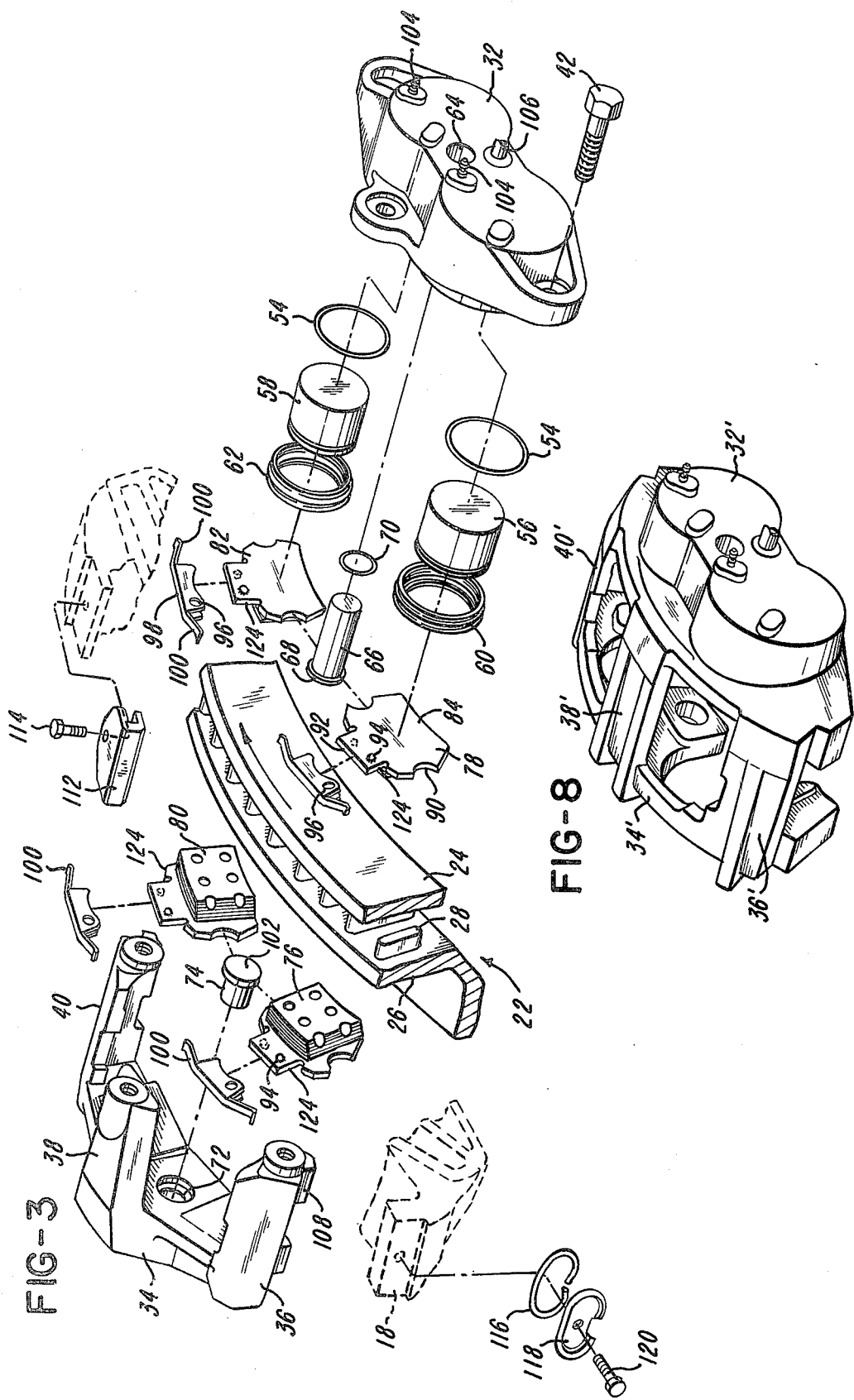

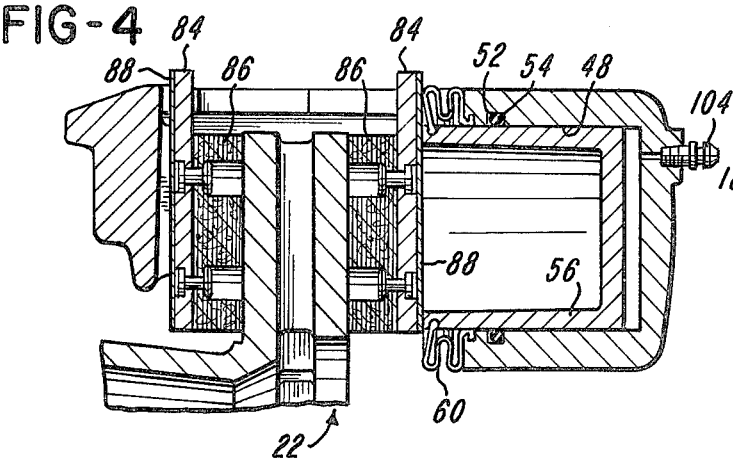
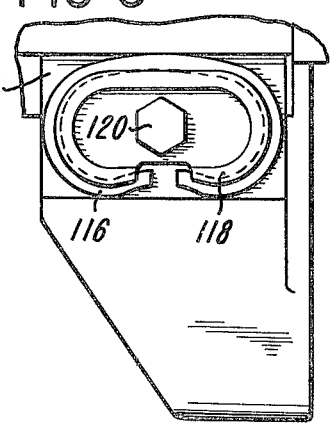
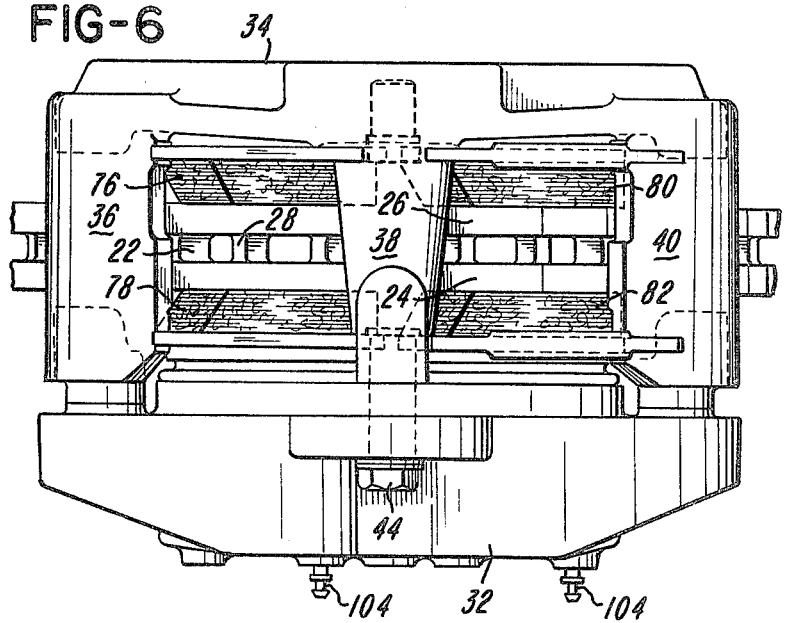
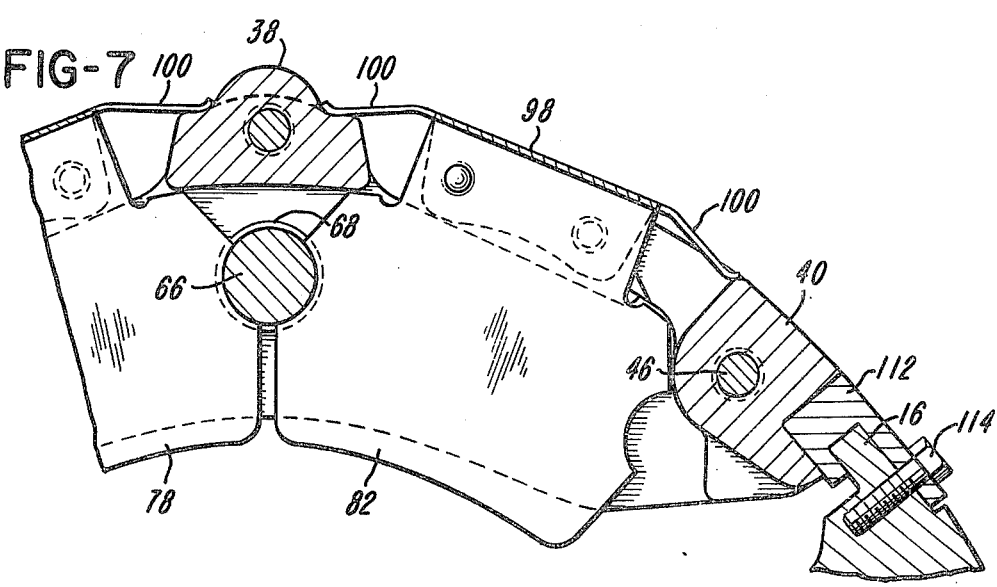

DISC BRAKE WITH CANTILEVERED TORQUE RECEIVING MEMBERS

BACKGROUND OF THE INVENTION

Floating caliper type disc brakes employing split or dual brake pads have received considerable acceptance, particularly for use with heavy duty vehicles, since they provide the higher braking capabilities required with such vehicles while imposing lower stresses on the backing plates for the pads than are encountered with relatively long, arcuately shaped plates, and also facilitate removal and replacement of the brake pads. For an example of a brake structure of this type, reference is had to U.S. Pat. No. 3,602,328.

In a construction of this type, the torque forces imposed on the brake pads are transferred through the backing plates for the pads to abutment surfaces formed on spaced bridges interconnecting the piston and reaction sides of the housing and a torque bar which extends across the housing and is bolted in place on each end to the piston and reaction sides of the brake housing.

With this type of construction, the torque applied to the brake pads is spaced radially inwardly from the points at which the torque is transferred from the brake pads to the torque receiving members on the brake housing. This obviously sets up a moment in the backing plate, rather than allowing a direct transfer of torque from the backing pad to the torque receiving members.

Additionally, in order to remove the brake pads the centrally located torque bar must be unbolted and lifted upwardly to disengage it from key ways formed in opposing surfaces of the piston and reaction portions of the housing. In some cases, however, the clearance between the top of the housing and the rim of the wheel with which the brake is associated is limited to the extent that use of this type of assembly is impractical.

It will also be noted that in the construction disclosed in the above noted patent the brake housing must be bolted at each end to a vehicle support arm. Thus, when removing the brake assembly both ends must be unbolted and the entire assembly then lifted out of place. Also with the floating type construction disclosed in the above noted patent, the brake housing must be free to move axially with respect to the disc. However, the looseness of fit necessary to permit this movement may also result in unnecessary noise at the instant of brake application.

SUMMARY OF THE INVENTION

The present invention provides a disc type brake assembly of split construction which incorporates cantilevered torque receiving members projecting axially toward opposite faces of the vehicle disc and engaging the brake pads substantially medially thereof to provide a substantially direct transfer of torque from the brake pads through the torque receiving members to the brake housing.

Thus, the brake assembly of the present invention includes an outer, caliper portion connected to an inner, piston portion by means of bridging members which extend from one portion to the other across the rim of the brake disc. The bridging members are positioned adjacent opposite ends of the housing, arcuately spaced from each other, and at the center of the housing intermediate the end bridging members.

In accordance with one embodiment of the invention the caliper or reaction portion and bridging members are formed integrally and the piston portion is formed as a separate piece which is bolted to the bridging members. In a second embodiment the piston and reaction portions and the bridging members are formed integrally to provide a one piece brake housing.

In both embodiments the braking pads are suspended from the bridging members to lie on opposite sides of the brake disc. Preferably, resilient suspending means are provided to prevent rattling of the brake pads.

A fixed pin extends inwardly from the reaction portion of the brake housing and engages arcuate abutment surfaces on the outer brake pads and thereby serves as a cantilevered torque receiving member. A movable pin is slidably mounted in an opening in the piston portion of the brake housing, extends axially outwardly, and is engaged by arcuate abutment surfaces on the inner brake pads, to thereby also serve as a cantilevered torque receiving member.

Both torque receiving members are positioned radially inwardly from the periphery of the disc and engage the brake pads substantially medially thereof to provide a substantially direct transfer of torque from the brake pads through the torque receiving members to the brake housing without appreciable moment being induced in the backing plates for the brake pads.

The support for the brake housing includes opposed, arcuately spaced rails and the housing is provided with rail engaging surfaces adjacent opposite arcuately spaced ends thereof. One of the rail engaging surfaces and one of the rails are interlocked by means of a slidable retainer which is thereafter bolted in place. The opposite rail carries a spring which engages the brake housing at that point and urges it toward the first rail. This prevents rattling of the brake housing on the housing support while still permitting sliding movement of the housing along the rails to provide automatic alignment of the housing with respect to the brake disc.

As the brake pads wear the inner brake pads will be moved farther away from the piston portion of the housing as the housing slides inwardly along the supporting rails. However, because the torque receiving pin for the inner brake pads is slidably mounted in the piston portion of the housing, it is free to move outwardly of the piston portion of the housing and remain in torque receiving relationship to the inner brake pads. To insure that the pin is always in position to receive torque from the inner brake pads it is provided with an enlarged head engaging an outer surface of the backing plates for the pads, assuring that the pin will move with the brake pad receiving the greatest amount of wear.

On the other hand, to prevent overtravel of the movable pin and, for example, engagement of the pin with the brake disc, the bore for the pin is provided with an O-ring type seal, which provides restraint to axial movement of the pin while still permitting the pin to move in response to brake pad wear.

BRIEF DESCRIPTION OF THE DRAWINGS

FIG. 1 is an elevational view of a brake assembly in accordance with one embodiment of the present invention with parts broken away;

FIG. 2 is an elevational view thereof with parts in section;

FIG. 3 is an exploded perspective view thereof;

FIG. 4 is a cross-sectional view through a portion of the brake assembly of FIG. 1;

FIG. 5 is a view taken on line 5—5 of FIG. 1;

FIG. 6 is a top view of the brake assembly of FIG. 1;

FIG. 7 is an enlarged cross-sectional view of a portion of the brake assembly of FIG. 1, turned somewhat from its normal operating position; and FIG. 8 is a perspective of a one piece brake housing in accordance with a second preferred embodiment of the invention.

DESCRIPTION OF THE PREFERRED EMBODIMENTS

As seen in FIGS. 1 and 2 of the drawings, the brake assembly will include a fixed support member 10 having outwardly extending arms 12 and 14 carrying opposed, arcuately spaced rails 16 and 18. The support 10 will generally be mounted on an axle 20 on which is rotatably mounted a vehicle wheel which also carries a rotatable brake disc 22. Disc 22, as will also be apparent from FIGS. 3 and 6 of the drawings, includes axially spaced braking surfaces 24 and 26 interconnected by a plurality of webs 28.

The brake housing 30 consists primarily of a piston portion 32 and a reaction portion 34 joined by three, arcuately spaced bridge members 36, 38 and 40 which receive bolts, as at 42, 44 and 46 to secure the two portions of the housing together.

The piston portion of the brake housing is bored, as best seen in FIGS. 1 and 4, to provide cylinder bores 48 and 50. Each of the cylinder bores is grooved, as at 52, to receive an O-ring or other annular seal 54. A pair of pistons 56 and 58 are slidably received in their respective cylinder bores and are provided with boots 60 and 62 to provide a dust proof shield.

The piston portion 32 is also bored at 64, and slidably receives a pin 66 having a head 68. Bore 64 is also preferably provided with an annular groove receiving an annular seal as shown at 70 in FIG. 2 of the drawings. The reaction portion 34 of the brake housing is provided with a bore 72 within which is press fitted a shouldered pin 74.

Brake pads 76, 78, 80 and 82 are disposed in opposed pairs within the brake housing. Each brake pad includes a backing plate 84, a lining 86 and an insulator 88 (see FIG. 4 of the drawings). Each of the backing plates is provided with arcuate notches 90 and an upwardly extending tab 92 having spaced projections 94 extending from opposite faces of the tab 92.

The projections 94 are adapted to be received in opening 96 formed in springs 98, which have outwardly extending arms 100 adapted to rest on the bridging members 36, 38 and 40. This relationship can best be seen in FIGS. 1, 3, 6 and 7 of the drawings.

With the pins 74 and 66 mounted in the reaction and piston portions of the brake housing, it will be seen that the brake pads can be turned at an angle, slipped through the openings between the bridging members 36 through 40 and then twisted to their operative positions.

In the case of the pads 76 and 80, this will be with one arcuate notch of each abutting opposite surfaces of the enlarged head 102 of the pin 74. With respect to the pads 78 and 82, one notch of each will underlie the enlarged head 68 of the pin 66 when these pads are in their proper position. It will also be apparent from the drawings that the brake housing is provided with the usual bleed openings, as at 104, and a pressurizing line, as at 106.

With the brake housing and its components assembled, the rail engaging surface 108 adjacent the bridging member 36 is positioned on the rail 18 and the rail engaging surface 110 adjacent the bridging member 40 is positioned adjacent the rail 16. Thereafter, a retainer 112 is slid into position between the surface 110 and the rail 16 and bolted in place, as indicated at 114.

This locks the brake housing in position on the support 10 with the brake pads 76 and 80 positioned adjacent the outer face of the disc 22 and the pads 78 and 82 positioned adjacent the inner face of the disc 22.

The anti-rattle spring, see FIGS. 1, 3 and 5, is mounted on the rail 18 and includes a substantially C-shaped spring 116 attached to the rail 18 by means of a spring retainer 118 and a bolt 120. This construction urges the brake housing 30 toward the rail 16 and prevents rattling of the unit on the supporting rails.

As the linings on the brake pads wear, the brake housing will tend to shift to the right as seen in FIG. 2 of the drawings, causing the brake pads 78 and 82 to be moved progressively farther from the piston portion of the braking housing. However, because the head 68 of the pin 66 is engaged by the backing plates of the pads 78 and 82, the pin 66 will move out of the piston portion 32 commensurate with the spacing between the piston portion 32 and the inner brake pad experiencing the greatest wear.

As perhaps can be best appreciated from an inspection of FIGS. 3 and 7 of the drawings, it will be noted that the torque receiving members 74 and 66 are positioned substantially medially of their respective brake pads so that torque transfer from the pads to the members 66 and 74 occurs with substantially little imposition of moment on the backing plates 84 and consequently little tendency to rotate.

Additionally, since the central torque bar of prior art constructions is replaced by the cantilever torque receiving members 66 and 74, the amount of clearance necessary between the brake housing and the ram 122 of the vehicle wheel (see FIG. 2) is less critical.

The bridging members 36 and 40, of course, will also serve as torque receiving members, engaging shoulders 124 on the brake pad backing plates. Thus, with the disc rotating in the direction indicated by the arrow in FIGS. 1 and 3 of the drawings, upon application of the brakes, torque from the brake pads 80 and 82 would be transferred through their shoulders 124 to the bridging member 40 while torque from the pads 76 and 78 would be transferred through the arcuate portions 90 to the pins 74 and 66.

Of course, with movement in the reverse direction, the reverse abutment surfaces of the braking pads would engage the pins 66 and 74 and the bridging member 36. It should also be noted that although members 66 and 74 are referred to as pins, they could also be of tubular construction and, of course, could be other than circular in cross section.

In the description above the brake housing has been described as including separate piston and reaction portions 32 and 34 joined by bolts 42, 44 and 46. As will be apparent from FIG. 8, however, the piston and reaction portions and the bridging members extending therebetween may all be formed integrally to provide a one piece housing. Thus, as seen in FIG. 8, piston portion 32' is joined to reaction portion 34' by bridging members 36', 38' and 40' formed integrally with the piston and reaction portions. In all other respects, however, the embodiment of the housing of FIG. 8 functions with the remaining elements of the brake system essentially the same as the embodiment of FIGS. 1–7.

Regardless of whether the housing is formed of one or a plurality of pieces, it will be seen that the present invention provides a floating type, split disc brake construction in which the necessity of a central torque bar extending axially across the disc is eliminated and the central torque receiving members are constituted by internally located, cantilevered pins positioned to more directly receive torque from the brake pads during braking action.

While the form of apparatus herein described constitutes a preferred embodiment of the invention, it is to be understood that the invention is not limited to this precise form of apparatus, and that changes may be made therein without departing from the scope of the invention.

What is claimed is:

1. A disc brake assembly comprising:
  a. a rotatable braking disc adapted to rotate with a vehicle wheel,
  b. a brake housing support including opposed brake rails disposed at spaced positions about the periphery of said disc,
  c. a brake housing having rail engaging surfaces mounted on said brake rails,
  d. retaining means for locking one of said rail engaging surfaces of said brake housing to one of said brake rails,
  e. spring means associated with the other of said rails, engaging the other of said rail engaging surfaces of said brake housing and urging said brake housing toward said one rail and said retaining means associated therewith,
  f. said brake housing including arcuately shaped piston and reaction portions disposed on opposite sides of said disc,
  g. bridging means extending across a periphery of said disc from said piston to said reaction portion of said brake housing adjacent said rail engaging surfaces thereof and at the center thereof,
  h. said bridging means defining a pair of openings through said housing to said disc,
  i. opposed pairs of brake pads received in each of said openings on opposite sides of said disc,
  j. means resiliently suspending said brake pads from said bridging means,
  k. fixed pin means mounted in said reaction portion of said brake housing beneath said bridging means, extending inwardly and terminating spaced from an outer face of said disc,
  l. movable pin means slidably mounted for movement axially thereof in said piston portion of said brake housing, extending axially outwardly and terminating spaced from an inner face of said disc,
  m. said fixed and movable pins being disposed radially inwardly of said periphery of said disc,
  n. first abutment means on each of said brake pads adapted to engage said bridging means positioned adjacent said rail engaging surfaces,
  o. second abutment means on each of said brake pads adapted to engage said fixed and movable pins, and
  p. piston means slidably received within said piston portion of said brake housing and adapted to effect frictional engagement of said brake pads with said inner and outer surfaces of said disc.

2. A disc brake assembly comprising:
  a. a brake housing including a piston portion and an opposing reaction portion adapted to be disposed on opposite sides of a rotatable brake disc,
  b. bridging means interconnecting said piston and reaction portions and adapted to extend over the periphery of a brake disc with which said assembly is associated,
  c. opposed pairs of brake pads adapted to be disposed on opposite sides of a brake disc with which said assembly is associated,
  d. said bridging means being disposed in spaced relationship to each other and radially outwardly of the periphery of a disc with which said assembly is associated with the spacing between adjacent bridging means being sufficiently large to permit the insertion of said brake pads therebetween into said brake housing,
  e. each of said brake pads having shoulders engaging the bridging means adjacent thereto,
  f. a first torque receiving member projecting from said piston portion of said housing substantially medially thereof radially inwardly of the periphery of the disc with which said assembly is associated and intermediate the bridging means engaged by shoulders of said brake pads and terminating spaced from said reaction portion,
  g. a first pair of said brake pads on the side of said assembly adjacent said piston portion each engaging said first torque receiving member at portions on said brake pads opposite said shoulders thereof,
  h. a second torque receiving member projecting from said reaction portion of said housing substantially medially thereof radially inwardly of the periphery of the disc with which said assembly is associated and intermediate said bridging means engaged by shoulders of said brake pads and terminating spaced from said reaction portion, and
  i. a second pair of said brake pads on the side of said assembly adjacent said reaction portion each engaging said second torque receiving member at positions on said brake pads opposite said shoulders thereof and at least one of said torque receiving members is received within its housing portion for slidable movement during operation of said brake assembly in a direction parallel to the axis of rotation of the brake disc with which said assembly is associated.

3. The assembly of claim 2 further comprising:
  a. spring means suspended from adjacent bridging means, depending into the spaces between adjacent bridging means and supporting resiliently said brake pads within said housing.

4. The assembly of claim 2 wherein:
  a. one of said torque receiving members has an enlarged head, and
  b. the brake pads associated therewith engage said torque receiving member at said enlarged head.

5. The assembly of claim 2 wherein said torque receiving members comprise:
  a. a fixed pin mounted in said reaction portion, and
  b. said slidable torque receiving member is a pin mounted in said piston portion.

* * * * *